US007014750B2

(12) United States Patent
Boger et al.

(10) Patent No.: US 7,014,750 B2
(45) Date of Patent: Mar. 21, 2006

(54) SYSTEM AND PROCESS FOR PYROLYSIS GASOLINE HYDROTREATMENT

(75) Inventors: Thorsten R. Boger, Bad Camberg (DE); Shantanu Roy, Painted Post, NY (US); Charles M. Sorensen, Jr., Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/913,676

(22) Filed: Aug. 5, 2004

(65) Prior Publication Data

US 2005/0006281 A1 Jan. 13, 2005

Related U.S. Application Data

(62) Division of application No. 10/184,364, filed on Jun. 26, 2002.

(51) Int. Cl.
*C10G 45/02* (2006.01)
*C10G 45/32* (2006.01)
*C07C 5/07* (2006.01)

(52) U.S. Cl. ............... 208/143; 208/144; 585/250; 585/258; 585/259; 585/260; 585/275; 585/276

(58) Field of Classification Search ........... 208/143, 208/144; 585/250, 258, 259, 260, 275, 276
See application file for complete search history.

(56) References Cited

U.S. PATENT DOCUMENTS

| 3,489,809 | A | * | 1/1970 | Keith et al. ........... 585/260 |
| 3,492,220 | A | * | 1/1970 | Lempert et al. ........ 208/144 |
| 3,518,206 | A | * | 6/1970 | Sowards et al. ........ 502/64 |
| 3,885,977 | A | | 5/1975 | Lachman et al. |
| 4,483,944 | A | | 11/1984 | Day et al. |
| 4,631,267 | A | | 12/1986 | Lachman et al. |
| 5,633,217 | A | | 5/1997 | Lynn |
| 5,866,734 | A | * | 2/1999 | Flick et al. ........... 585/260 |
| 6,005,143 | A | * | 12/1999 | Machado et al. ........ 564/423 |
| 6,019,951 | A | * | 2/2000 | Sie et al. ............. 422/222 |
| 6,388,150 | B1 | * | 5/2002 | Overbeek et al. ....... 585/260 |
| 6,436,873 | B1 | * | 8/2002 | Brocker et al. ......... 502/439 |
| 6,479,704 | B1 | * | 11/2002 | Nordquist et al. ....... 564/423 |
| 6,632,414 | B1 | * | 10/2003 | Liu .................. 423/659 |
| 6,673,237 | B1 | * | 1/2004 | Liu et al. ............. 208/213 |
| 6,716,339 | B1 | * | 4/2004 | Liu et al. ............ 208/208 R |
| 2003/0056912 | A1 | * | 3/2003 | Dellve et al. .......... 162/135 |

FOREIGN PATENT DOCUMENTS

EP 233642 A2 * 8/1987
WO WO 2004000454 A1 * 12/2003

OTHER PUBLICATIONS

D.S. Soni and B.L. Crynes, "A Comparison of the Hydrodesulfurization and Hydrodenitrogenation Activities of Monolith Alumina Impregnated with Cobalt and Molybdenum and a Commercial Catalyst", ACS Symp. Ser., 156 (1981), 156-207.*
S. Irandoust and O. Gahne, "Competitive Hydrodesulfurization and Hydrogenation In a Monolithic Reactor", AIChE Journal, vol. 36, No. 5, pp 746-752 (1990).*
R. K. Edvinsson and A. Cybulski, "A comparison between the monolithic reactor and the trickle-bed reactor for liquid-phase hydrogenations", Catalysis Today 24 (1995), 173-179.*
Hatziantoniou, et al., "The Segmented Two-Phase Flow Monolithic Catalyst Reactor. An Alternative for Liquid-Phase Hydrogenations" Ind. Eng. Chem. Fundam., vol. 23, No. 1, 82-88 (1984).*
Hatziantoniou, et al., "Mass Transfer and Selectivity in Liquid-Phase Hydrogenation of Nitro Compounds in a Monolithic Catalys Reactor with Segmented Gas-Liquid Flow", Ind. Eng. Chem. Process Des. Dev., vol. 25, No. 4, 964-970 (1986).*
Smits et al., "Selective Three-Phase Hydrogenation of Unsaturated Hydrocarbons in a Monolithic Reactor", Chemical Engineering Science, 1996 (51), 3019-3025.
Nijhuis et al., "Preparation of Monolithic Catalysts", Catalysis Reviews, 43(4), 345-380.

* cited by examiner

*Primary Examiner*—Walter D. Griffin
(74) *Attorney, Agent, or Firm*—Kees van der Sterre

(57) ABSTRACT

Systems and processes for the hydrotreatment of pyrolysis gasoline comprising reactors, monolithic catalyst beds and hydrogen-containing treatment gases that allow for improved efficiency and productivity over conventional trickle bed processes and systems for such hydrotreatment.

13 Claims, 2 Drawing Sheets

SYSTEM AND PROCESS FOR PYROLYSIS GASOLINE HYDROTREATMENT

This is a divisional of U.S. patent application Ser. No. 10/184,364 filed on Jun. 26, 2002, the content of which is relied upon and incorporated herein by reference in its entirety, and the benefit of priority under 35 U.S.C. § 120 is hereby claimed.

BACKGROUND OF THE INVENTION

The present invention relates to the hydrotreatment of pyrolysis gasoline, and more particularly to processes and equipment for carrying out such hydrotreatment at reduced cost and with increased efficiency.

Pyrolysis gasoline (also referred to as "pygas") is a liquid by-product of the steam cracking process to make ethylene and propylene. Pyrolysis gasoline is a highly unsaturated hydrocarbon mixture (carbon range of about $C_5$–$C_{14}$) that is rich in dienes, olefin and aromatics, especially benzene. In addition, pyrolysis gasoline includes undesirable heteroatom-containing hydrocarbons, such as sulfur- and nitrogen-containing compounds. To allow for its use as a gasoline blendstock, pyrolysis gasoline must be at least partially hydrogenated or hydrotreated to reduce the levels of unsaturation and heteroatom-containing hydrocarbons. Left untreated, pyrolysis gasoline typically degrades to form gums and varnishes in fuel systems.

Pyrolysis gasoline is hydrotreated today in conventional fixed bed reactors using pellet catalysts. Generally, trickle flow operation is employed. One problem with this type of operation is that incomplete wetting of the bed by liquid reactants and channeling of the gas flow through preferential flow passages may occur which reduces bed utilization. In addition, bed pressure drop is limited by the catalyst particle size and in many cases it would be desirable to reduce the catalyst particle size if the pressure drop limitation could be overcome. Additionally, conventional fixed bed reactors are prone to runaway hot spots, posing numerous health, safety, and environmental issues. Hot spots occur when catalyst is insufficiently wetted by liquid feed, and unsaturated hydrocarbons in the gas phase continue to react and release heat. Due to the exponential dependence of reaction rate on temperature, the hot spots can start to run away, leading to high temperatures and possibly even explosions.

Hydrotreating processes have been studied using alternative catalysts. For example, Smits et al., Chemical Engineering Science, 1996 (51), 3019–3025, describe a method for hydrotreating a mixture of styrene and 1-octene in toluene over a monolithic catalyst. The mixtures used by Smits et al. in their modeling experiments, however, differ significantly from actual pyrolysis gasoline compositions. For example the model system studied by Smits et al. contained only three different compounds while actual pygas contains at least 130 different compounds, and recent data indicate that the hydrogenation reaction rate of styrene in a pygas matrix is as much as 15–20 times slower than the same rate in an ethylbenzene or toluene matrix. Thus the Smits findings have little, if any, applicability to the hydrotreatment of actual pyrolysis gasoline compositions on an industrial scale.

In view of the above-described drawbacks and inefficiencies associated with conventional pyrolysis gasoline hydrotreatment as it is currently practiced, there is a clear need for continued improvement in many aspects of the process. There is a need to improve the reactors and the pyrolysis gasoline hydrotreatment process to reduce reactor size and cost, to more effectively use the hydrogen reactant, to more effectively use electricity and water, and to improve the overall bed utilization by employing better hydrodynamics. The processes described hereinafter help fulfill these and other needs.

SUMMARY OF THE INVENTION

In one important aspect the present invention is directed to a process for hydrotreating pyrolysis gasoline feed, that process comprising the step of contacting said pyrolysis gasoline feed with a hydrogen-containing treatment gas in the presence of at least one catalyst bed comprising a monolithic catalyst. Preferred monolithic catalysts are generally of honeycomb configuration, i.e., monolithic structures presenting a plurality of parallel channels running from an inlet face to an outlet face of the structures bounded by channel walls formed of or coated or impregnated with catalyst.

In preferred embodiments the support portion of the monolithic catalyst comprises θ-alumina, either as a structural constituent of the monolith or as a coating on a support of another metal or ceramic material, e.g., an alumina coating on a cordierite ceramic honeycomb. Suitable catalysts for use in combination with such supports include hydrogenation catalysts selected from the group consisting of nickel, platinum, palladium, rhodium, silver, iron, cobalt, iridium, tin and mixtures thereof. Channel or so-called cell densities for these monolithic catalysts can range from as low as 1.5 to as high as 310 cells/cm2 of honeycomb cross-section (10–2000 cells/in$^2$).

The feed for carrying out the hydrotreating process of the invention comprises both gas and liquid constituents. If desired, a portion of the liquid product from the pyrolysis gasoline reactor is recycled. The gas component of the reactor feed will normally comprise at least about 50 mol % of molecular hydrogen. In the preferred embodiments of the invention, the gas and liquid feeds traverse multiple catalyst beds with hydrogen-containing treatment gas being introduced between the catalyst beds to replace hydrogen volumes consumed in the process.

In another aspect the invention includes a reactor system for hydrotreating pyrolysis gasoline feed. That system comprises one or more reactor vessels comprising at least one monolithic catalyst bed, each reactor vessel comprising a liquid feed inlet, an effluent outlet, and a hydrogen-containing treatment gas inlet. In preferred embodiments, a portion of liquid effluent from the outlet is recycled to the feed inlet. Also preferred is that at least one of the reactor vessels comprise more than one catalyst bed, that vessel further comprising means for introducing hydrogen-containing treatment gas to each of the catalyst beds through hydrogen-containing treatment gas inlets.

DETAILED DESCRIPTION

Figure 1:
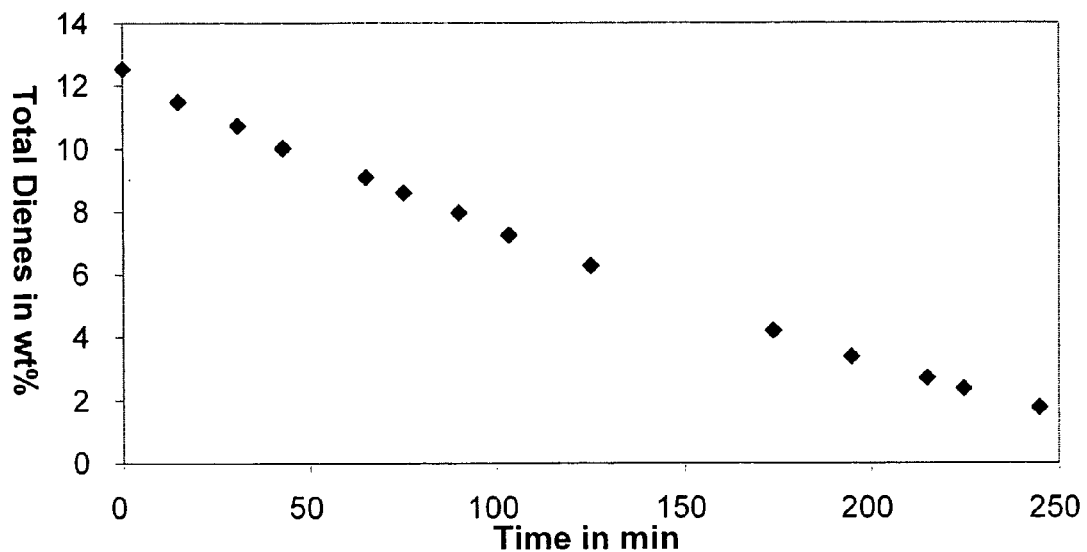
FIG. 1 is a plot of diene reduction as a function of time in a pyrolysis gasoline hydrotreating reactor provided in accordance with the invention.

Key to the present invention is the use of monolith catalysts in systems and processes for the hydrogenation (also referred to herein as "hydrotreatment") of pyrolysis gasoline. Monolithic catalysts are well known in the art and refer to a catalyst deposited on a solid support exhibiting substantially uniform structure (or geometry) throughout the structure. In the preferred embodiments the monolithic catalysts will have a honeycomb-type structure, which is typically characterized by a geometry comprising a plurality of parallel, open-ended channels running from a first or inlet face to a second or outlet face of the structure.

The "geometry," or "geometric structure," of honeycomb-type catalysts may refer not only to the structural features of the catalyst but also the material characteristics found with some degree of uniformity throughout the material. For example, geometry can include, inter alia, pore size, channel structure, channel diameter, cell density, wall thickness, void fraction, open frontal area (i.e., percentage of total surface area occupied by channels or void area), and the like. Monolithic catalysts can also be referred to as "monoliths" or "honeycomb catalyst."

Monolithic catalysts can be formed of, dispersed within, or manufactured as a monolithic structure consisting of channels bounded by intersecting channel walls running from one end of the structure to the other. The channels can have any of a number of cross-sectional shapes, including triangles, squares, rectangles, and hexagons, and channel sizes over a relative broad range of channel diameters ranges from fractions of a millimeter to centimeters or more. The preferred honeycombs will generally have cell densities in the range of about 7–160 cells/cm2 of honeycomb cross-section (50–1000 cells/in$^2$).

Examples of monolithic catalysts and their preparation are described throughout the art and illustrated, for example, in Nijhuis et al., Catalysis Reviews, 43(4), 345–380 (2001). Monolithic catalysts can be made from any material that is capable of providing a porous structure. Suitable catalyst support materials include oxides of silicon, magnesium, aluminum, titanium, zirconium, transition metal oxides, and mixtures and compounds thereof. Accordingly, some catalyst support materials include ceramics and zeolites. Examples of suitable ceramic materials are described, for example, in U.S. Pat. Nos. 3,885,977; 4,483,944; 4,631,267; and 5,633,217, each of which is incorporated herein by reference in its entirety. Cordierite honeycombs constitute particularly suitable catalyst supports.

The catalyst structure can, in turn, support washcoats, catalysts or catalyst combinations suitable for hydrotreating. For example, the support can include alumina, such as γ-alumina or θ-alumina either extruded into a monolithic form or washcoated onto another monolithic support structure. One function of the washcoat is to provide a high surface area support for the active catalytic components.

A hydrogenation catalyst component can be dispersed onto the monolith catalyst support surface by impregnating or coating. Hydrogenation catalyst components can include materials that aid in catalyzing the hydrogenation of unsaturated organic compounds. Examples include metals such as nickel, platinum, palladium, rhodium, ruthenium, silver, iron, copper, cobalt, chromium, iridium, tin, and alloys and mixtures thereof. Preferred hydrogenation catalyst components are nickel, platinum and palladium.

The monolithic catalyst aids in the hydrogenation of unsaturated pyrolysis gasoline components upon contacting with a hydrogen-containing treatment gas. "Hydrogen-containing treatment gas" refers to a gas containing molecular hydrogen that can be used to convert, wholly or partially, unsaturated organic compounds to their saturated form. The hydrogen-containing treatment gas will typically comprise at least about 50 mol % molecular hydrogen. The hydrogen-containing treatment gas can consist of 100 mol % hydrogen or it may comprises other gases, such as non-reactive gases. Examples of suitable non-reactive gases include without limitation nitrogen, carbon dioxide, methane, ethane, propane, butanes and mixtures of these and other gases.

The "contacting" of the pygas and hydrogen-containing treatment gas with the monolithic catalyst for the purposes of the present invention simply involves the bringing together of reactants with the catalyst bed at a temperature and for a time sufficient that molecular interactions effective to increase the hydrocarbon saturation of the feed stream can occur. The reaction conditions employed for processing will depend in part on the particular reactor design selected, but reaction temperatures of about 20° C. to about 350° C. and gas pressures of about 5 bar to about 100 bar are normally preferred. Advantageously, this contacting step may be carried out at a liquid hourly space velocity greater than 0.1 hr-1. Yet, under these conditions, at least about 10% conversion of dienes present in pyrolysis gasoline feeds of typical composition can be realized in a single pass through the reactor system.

As previously noted, the mixed feed utilized for pygas conversion in accordance with the invention typically consists of a mixture of both gas and liquid. The volumetric ratio of gas to liquid (the "G:L ratio") at reactor operating conditions can range from about 0.1 to 20:1, more typically 0.1 to about 10:1. However conditions providing a G:L ratio closer to 1:1, such as is characteristic of the Taylor flow regime, will normally be preferred. The operation of processes under Taylor flow is known in the art, and described, for example, in U.S. Ser. No. 10/027,645 filed Dec. 21, 2001, which is incorporated herein by reference in its entirety. Nevertheless, maintenance of Taylor flow is not a necessary condition for the practice of the invention, and the processes and apparatus of the invention can be operated in other flow regimes, including film flow and turbulent flow regimes, where required.

According to some of the preferred process variations operative in the invention the hydrogen-containing treatment gas consumed by the ongoing hydrogenation reactions occurring within the reactor system can be periodically and locally replenished. Advantageously, replenishment can occur at locations and rates effective to maintain a desired volumetric G:L value for flow mode control, while at the same time insuring that the quantity of hydrogen necessary for catalyst protection and overall reaction stoichiometry will be provided. A suitable method for achieving these results is to inject hydrogen into the process stream at several points along the length of the reactor. Suitable flow control methods are further described in U.S. Ser. No. 10/027,645, supra.

The processes of the present invention can be carried out with systems having one or more reactor vessels. In some embodiments, systems include two or more reactor vessels that are connected in series such that effluent from upstream vessels comprises feed for downstream vessels. Reactor vessels can contain one or more catalyst beds containing monolithic catalyst. In some embodiments, the reactor vessel can contain two or more catalyst beds and or the reactor systems may include two or more reactor vessels. Illustrative examples of reactor systems incorporating two or more reactor vessels are schematically shown in the drawings, as hereinafter more fully described. Suitable systems can contain two reactor vessels, wherein one vessel, such as the upstream vessel, comprises two catalyst beds, and the other vessel, such as the downstream vessel, comprises one catalyst bed. In any such system of multiple reactor beds, combinations of conventional packed bed and monolith beds may be used.

Generally, each reactor vessel will comprise one or more inlets, such as for pygas feed or effluent from upstream reactor vessels and for the hydrogen-containing treatment gas. The vessels will further comprise one or more outlets, such as for pygas product (effluent) and/or exhausted treatment gases. In vessels having more than one catalyst bed to be locally supplied with makeup hydrogen-containing treatment gas, inlets for that gas are situated to enable gas injection between catalyst beds. Such injection additionally helps to better control reactor temperature.

Catalyst beds can be operated according to any suitable mode including up-flow, down-flow, or horizontal flow configurations. Additionally, monolithic catalyst beds can be operated using co-current or counter-current gas/liquid flow. In co-current flow, the gas and liquid travel in the same direction, whereas in counter-current flow, the gas and liquid travel in opposite directions. Any combination of catalyst bed configuration and flow regime is suitable, including, for example, systems having multiple reactors independently operating under different configurations and flow regimes.

In some embodiments of the present invention, the processes include the ability to recycle the unreacted portion of the hydrogen-containing treatment gas back to the reactors so that unreacted hydrogen can be utilized efficiently in the hydrotreating process. Accordingly, in some embodiments, reactors have inlet and outlet valves that allow the gas to be recycled. In other embodiments, recycle gas is added to the hydrogen-containing treatment gas prior to injection into the reactor vessels.

The processes of the present invention further provide for a portion of the liquid reactor effluent to be recycled. Accordingly, the liquid fraction from a vapor/liquid separator downstream from the reactor(s) can be introduced directly into a reactor, for example, at a region in a reactor between catalyst beds or a region in a reactor upstream of a catalyst bed. Additionally, liquid recycle can be combined with pygas feed prior to injection into a reactor.

The systems of the present invention may further comprise a vapor/liquid separator, heat exchanger, pump, and/or gas compressor, the use of such system components being conventional. Examples of suitable pumps include without limitation, feed pumps, liquid recycle pumps, and the like. Gas compressors can be used, for example, to recycle the unreacted hydrogen-containing treatment gas.

Operating parameters of the systems and processes according to the present invention are somewhat dependent on the design and capacity of the system to be employed. In general, however, liquid hourly space velocities (volume of feed per hour per volume of catalyst) for the liquid pygas feed component will be at least about 0.1 hr-1. A principal objective and measure of hydrotreating system performance is the conversion of dienes to more saturated molecules. Conversion of dienes present in typical pygas feeds will be at least about 5% in a single system pass at these liquid hourly space velocities.

Other advantages of the hydrotreating systems and processes herein described will become apparent from the following examples, which are intended to be illustrative rather than limiting. One important advantage is that the use of monolithic catalysts can result in a much smaller reactor volume than for conventional technology such as trickle flow/pellet packed beds to achieve the same level of conversion. The present processes and systems also allow for a reduced hydrogen recycle rate compared with conventional technology.

EXAMPLE 1

Preparation of Monolith Catalyst

A monolithic catalyst support consisting of a cordierite monolith sample washcoated with theta-alumina is catalyzed with nickel using the following general procedure. An aqueous nickel impregnating solution is prepared by dissolving 600 grams of nickel nitrate in 1 liter of deionized water. The catalyst support is immersed in this solution at room temperature for approximately 30 minutes, then removed from solution and excess solution allowed to drain off. Air blowing is used to further remove excess solution. The sample is then dried by heating in an oven to 120° C. for 2 hours and finally calcined in flowing air at 250° C. for at least 2 hours in a furnace. Typical properties for such a finished catalyst are shown in Table 1 below.

TABLE 1

| Nickel on Washcoated Theta-Alumina Catalyst Properties | |
|---|---|
| Cell Density, cpsi | 400 |
| Cordierite Web Thickness, 0.001 inch | 6.5 |
| Θ-Alumina Washcoat Loading, wt % | 19–23 |
| Nickel Loading, wt % | 1.7 |
| BET Surface Area, m2/g | 12.3 |

EXAMPLE 2

Nickel Catalyst Conversion of Pygas

The nickel on washcoated θ-alumina monolith catalyst described in Example 1 is tested in a fixed bed pilot reactor for pyrolysis gasoline hydrogenation activity and selectivity. The catalyst is first pre-treated in flowing hydrogen at 400° C. and 3.5 bar pressure for 16 hours to reduce the nickel and generate active hydrogenation sites.

To conduct the test, the test unit is operated as a recycling or "differential" reactor in a batch recycle mode. The mode involves the continuous recirculation of liquid feed and hydrogen-containing gas over the monolith bed. Fresh hydrogen is added continuously to compensate for the consumption of hydrogen due to reaction with the pygas feed. Periodically a sample of the hydrotreated pygas product is withdrawn from the process stream and tested by gas chromatography to measure the progress of the reaction.

Changes in total diene concentration as a function of time are shown in FIG. 1 of the drawings which plots the total mole fraction of dienes remaining in the recirculating pygas feed as a function of reaction time in minutes. These results are indicative of the rates of reduction in diene concentration attainable with actual pyrolysis gasoline feeds using monolith catalysts of the geometry and composition described.

EXAMPLE 3

Trickle Bed Pygas Hydrotreating (Comparative Example)

Conventional methods for the hydrotreatment of pyrolysis gasoline are based on a fixed bed reactor technology employing randomly packed bead catalyst beds in a trickle flow mode. In this process the raw pygas is first combined with a hydrogen containing treatment gas, and the gas and liquid mixture is then preheated by means of heat exchangers. The preheated mixture is then fed into a reactor vessel, which can comprise one or two catalyst beds.

In the case of a two-catalyst-bed reactor both beds can be made up of the same or different catalyst volumes. The mixture of gas and liquid first passes through the first catalyst bed and then through the second catalyst bed. The reactor effluent is cooled by means of heat exchangers and then the gas and the liquid phase are separated. The separated gas stream is usually recycled back and mixed again with fresh pygas, with hydrogen-containing makeup gas being at that stage to balance for the consumed hydrogen. The separated liquid product is sent to downstream processing units.

Conventional processes commonly use part of the cooled liquid product to control the overall temperature rise in the reactor resulting from the exothermic hydrogenation reactions. For this purpose a portion of the cooled liquid product is typically recycled and introduced into the reactor in between the two catalyst beds by means of some quench internals.

Typical liquid hourly space velocities (LHSV) for the operation of conventional trickle beds for pygas hydrogenation, e.g., beds consisting of commercial nickel (10% wt) catalysts on alumina beads, are in the range of 1–3 h$^{-1}$. The gas to liquid ratio at the reactor inlet at actual conditions is generally in the range of 4–10m$^3$/m$^3$.

The characteristics of a conventional pygas feed of the kind regularly treated in such a reactor are given in Table 2 below. As noted above, pygas often consists of more than one hundred individual components. For purposes of comparison, however, these components may be grouped into a smaller number of representative components based on their number of unsaturated bonds, molecular weight, carbon number and boiling point. For example, the linear and branched C6 components may be lumped into the group of the C6 components with a methyl group attached to a cyclic C5 ring. The components of a thus-simplified pygas composition, together with the weight percent proportions of those components in a raw pygas mixture, are listed in Table 3.

TABLE 2

| Pygas Feed Characteristics | |
|---|---|
| Density | 842 kg/m$^3$ |
| Molecular Weight | 86.9 kg/kmole |
| BTX Aromatics Composition | 69.67 wt % |
| Total Dienes | 10.6 wt % |
| Total Olefins | 7.36 wt % |
| Styrene Content | 1.93 wt % |
| ASTM D86 Distillation | |
| IBP | 13.4° C. |
| 5% | 30° C. |
| 50% | 91.7° C. |
| 95% | 170° C. |
| FBP | 180° C. |

TABLE 3

| Simplified Pyrolysis Gasoline Composition (wt. %) | |
|---|---|
| n-Butane | 0.33 |
| 2M-1-butene | 3.40 |
| i-Pentane | 1.14 |
| 1,3-Cyclopentadiene | 1.66 |
| Cyclopentene | 0.45 |
| Cyclopentane | 0.35 |
| 1,4-Pentadiene | 1.81 |
| 1-Pentene | 0.70 |
| n-Pentane | 1.95 |
| 2M-1 Pentene | 0.39 |
| 2Mpentane | 1.11 |
| Methylcyclopentadiene | 1.60 |
| 1Methylcyclopentene | 0.71 |
| Methylcyclopentane | 1.98 |
| Benzene | 39.15 |
| Styrene | 1.93 |
| E-Benzene | 7.37 |
| Toluene | 17.99 |
| Xylene | 5.15 |
| Dicyclopentadiene (C10H12) | 3.84 |
| Dihydrodicyclopentene (C10H14) | 1.53 |
| Tetrahydodicyclopentane (C10H16) | 1.58 |
| Methyl-Dicyclopentadiene (C11H14) | 1.68 |
| Methyl-Hydrodicyclopentene (C11H16) | 0.17 |
| Methyl-TetraHydro dicyclopentane (C11H18) | 2.02 |
| Total | 100 |

Typical results for a conventional trickle bed pygas hydrotreating process may readily be predicted for a given set of normal reactor inlet and operating conditions based on pilot plant tests and detailed process simulations. Table 4 below reports one set of such operating conditions for a conventional trickle bed reactor design, and typical conversion results to be expected from reactor operation under such conditions.

The process results reported in Table 4 are based on a two pellet-bed reactor configuration with liquid product recycle for process temperature control. The volume of the first catalyst bed represents 29% of the total catalyst volume, the remaining 71% of catalyst volume being located in the second bed. Liquid product recycle for process temperature control is by liquid product recycle injection between catalyst pellet beds at a rate of 7.6% wt of the raw pygas feed, this rate being effective to control the temperature rise within the reactor to not more than 70 K above the reactor inlet temperature. The gas and liquid reactor effluent is separated into a liquid product stream and a gas stream for recycle, the latter being temperature adjusted to 40° C.

Data concerning the operation of the reactor set forth in Table 4 below include the liquid hourly space velocity of the pygas feed, the reactor inlet temperature, the reactor inlet pressure, the gas:liquid ratio at the reactor inlet, and the hydrogen content of the gas feed to the reactor. Typical processing results reported for the product under these operating conditions include total product dienes, olefins, and styrene as well as the density and molecular weight of the product.

TABLE 4

Trickle Bed Pyrolysis Gasoline Hydrotreatment

| Process Variable | |
|---|---|
| LHSV | 1.8 h$^{-1}$ |
| Reactor Inlet Temperature | 70° C. |
| Reactor Inlet Pressure | 36.7 bar |
| Gas to Oil Ratio (inlet to reactor, actual conditions) | 4.64 m$^3$/m$^3$ |
| Hydrogen Content of Treat Gas (prior to mixing with pygas) | 85.5% mole |

| Product Data | Content | Conversion |
|---|---|---|
| Total Dienes | 1.00 wt % | 90.56% |
| Total Olefins | 8.48 wt % | −16.01% |
| Total Styrene | 0.25 wt % | 87.16% |
| Density[a] | | 833 kg/m$^3$ |
| Molecular Weight[a] | | 87.1 kg/kmole |

[a] After a simple flash to 1 bar and 20° C.

EXAMPLE 4

Monolith Catalyst Pygas Hydrotreating Process

A pyrolysis gasoline hydrotreating system and process according to the present invention are designed, based on the use of a Ni/θ-alumina washcoated monolith catalyst such as described above in Example 1. The reactor unit is designed and sized to operate at the same overall pygas feed rate and to produce the same product quality and temperature control constraints as the trickle bed reactor of Example 3.

The particular catalyst design selected for use in this reactor consists of a cordierite support having a cell density of 400 cells per square inch (cpsi) washcoated with a θ-alumina coating onto which nickel is applied as the main catalytic active phase at a concentration of about 1.69 wt % of the coated monolith. Kinetics based on data for pygas conversion developed from bench and pilot tests of reactors incorporating such catalysts are used as basic input for design of this system.

Figure 2:
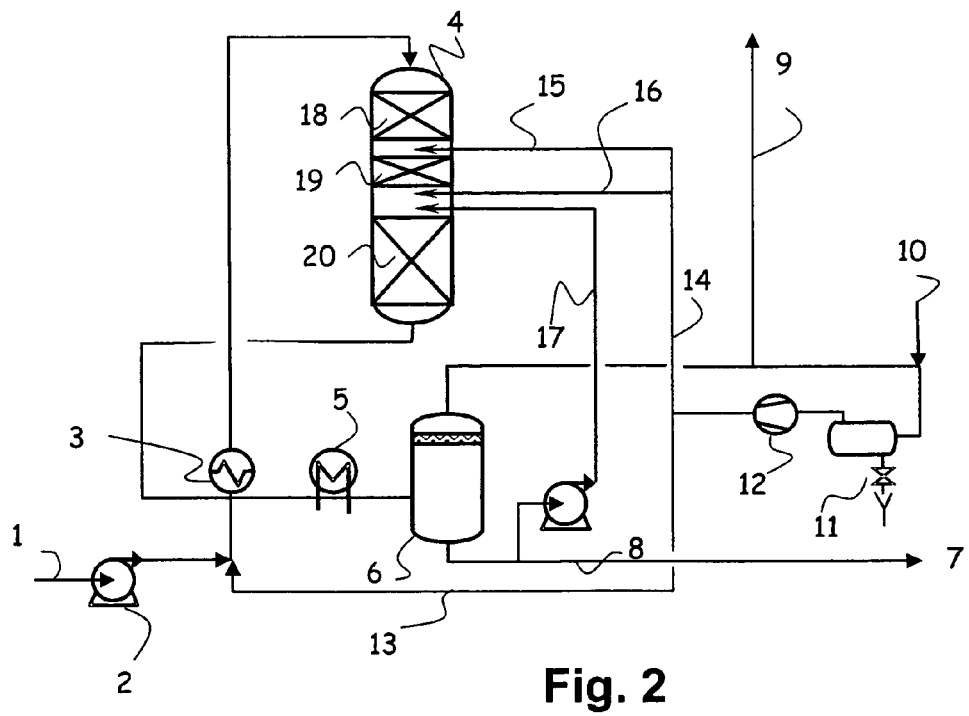
FIG. 2 schematically illustrates a pyrolysis gasoline hydrotreating apparatus and process according to the invention.

FIG. 2 of the drawing sets forth a simplified system component and process flow diagram for the system employing this catalyst. Referring more specifically to FIG. 2, a raw pygas feed 1 enters the unit via the feed pump 2 and is mixed with a first fraction 13 of a treatment gas coming from a recycle compressor 12. This gas/liquid mixture is then preheated to the reactor inlet temperature by a feed-effluent heat exchanger 3 and fed into a reactor 4.

Reactor 4 includes three monolithic catalyst beds 18, 19, 20 comprising the honeycomb catalyst. A second fraction 14 of the treatment gas from recycle compressor 12 is split into two portions. One of these portions 15 is injected into the reactor in between the first 18 and the second 19 catalyst bed. The second portion of the treatment gas 16 is injected into the reactor between the second 19 and the third 20 catalyst bed, together with the liquid recycle 17 coming from the liquid recycle pump 8. Liquid recycle 17 provides for reactor temperature control.

Process variables and the product characteristics targeted to result from that process are reported in Table 5 below, these being based the a catalyst bed design and process parameters reported in Table 6 below. Included in Table 5 are reactor operating data including the liquid hourly space velocity of the pygas feed, the reactor inlet temperature, the reactor inlet pressure, the gas:liquid ratio at the reactor inlet, and the hydrogen content of the gas feed to the reactor. Typical processing results reported for the product under these operating conditions include total product dienes, olefins, and styrene as well as the density and molecular weight of the product. Table 6 reports the relative volumes of each of the three catalyst beds as illustrated in FIG. 2, along with the inlet and outlet gas:liquid (G:L) ratios and temperatures for each of the three beds.

TABLE 5

Monolithic Catalyst Pyrolysis Gasoline Hydrotreatment

| Process Variable | |
|---|---|
| LHSV | 11.8 h$^{-1}$ |
| Reactor Inlet Temperature | 70° C. |
| Reactor Inlet Pressure | 36.7 bar |
| Gas to Oil Ratio (inlet to reactor, actual conditions) | 0.84 m$^3$/m$^3$ |
| Hydrogen Content of Treat Gas (prior to mixing with pygas) | 89.5% mole |

| Product Data | Content | Conversion |
|---|---|---|
| Total Dienes | 1.00 wt % | 90.56% |
| Total Olefins | 8.62 wt % | −18.01% |
| Total Styrene | 0.27 wt % | 86.10% |
| Density[a] | | 833 kg/m$^3$ |
| Molecular Weight[a] | | 87.1 kg/kmole |

[a] After a simple flash to 1 bar and 20° C.

TABLE 6

Monolith Catalyst Bed Data

| Catalyst Bed Segment (FIG. 2) | (18) | (19) | (20) |
|---|---|---|---|
| Relative Catalyst Volume | 30% | 20% | 50% |
| G:L Inlet | 0.84 | 0.90 | 1.03 |
| G:L Outlet | 0.57 | 0.68 | 0.63 |
| Temperature Inlet | 70° C. | 91° C. | 102° C. |
| Temperature Outlet | 92° C. | 112° C. | 140° C. |

The staged gas/liquid injection strategy employed in this design allows the reactor to be operated at a very even axial gas/oil (G:L) profile. At the same time control over reactor temperatures and sufficient supply of hydrogen to the reactor are assured. For example, control over maximum reactor temperature to not more than 70° C. above the reactor inlet can be achieved via a liquid recycle rate of 19% of the raw pygas flow rate.

Good conversion efficiencies through monolithic catalyst beds of the particular geometry above described have been demonstrated when the actual volumetric gas to liquid flow ratio is in the range of approximately G:L=0.2 to 2, more preferably in the range of 0.5 to 1. This is well below the ratios attainable in trickle beds, wherein G:L ratios are generally in excess of 4. In addition, these reactors are designed to operate at higher linear velocities than are possible with trickle bed reactors, and without a pressure drop penalty across the catalyst bed. This is due to the low flow resistance inside the straight channels of the monoliths. Trickle bed reactors require a significant excess of hydrogen in the reactor feed to ensure a sufficient hydrogen supply throughout the reactor at the achievable mass transfer rates, the excess hydrogen also being needed to enhance mass transfer in pellet catalyst beds.

The design according to the present invention thus offers two important advantages over conventional trickle bed reactor designs. First, the use of monolithic catalysts enables higher mass transfer when operated under the described conditions, thereby relieving the high hydrogen partial pressure requirements of the trickle bed process. That is, because the process rate limiting variable of the rate at which hydrogen is supplied to the catalyst surface is the product of the mass transfer coefficient and the driving force, the higher mass transfer coefficient permits the use of a reduced driving force.

Secondly, the process design ensures appropriate hydrogen supply along the entire reactor length, thereby maintaining the gas to liquid ratio, and hence the hydrogen available, within an appropriately controlled range. This is achieved by dividing the total treatment gas requirement of the system into at least two portions of appropriate flow rate, and introducing these two portions both conventionally (into the reactor inlet with the liquid feed) and at one or more additional locations along the reactor length (between monolith catalyst beds).

The practical benefits of these system characteristics are apparent from the data. First, the better performance of the monolithic catalytic reactor permits reactor operation at significantly higher space velocities, e.g. 11.8 h$^{-1}$ vs. 1.8 h$^{-1}$ for the trickle bed reactor of Example 3, to produce equivalent product from identical liquid feeds. Thus catalyst requirements are reduced and capital costs for a new reactor installation are significantly lessened. Alternatively, existing hydrotreating units may be upgraded to utilize the enhanced catalyst performance to increase unit capacity, if desired, or to increase the cycle length.

Further, due to the ability to operate at lower G:L ratios in the monolith reactor, the amount of treating gas which needs to be recycled is significantly reduced. Accordingly the specific energy requirements for the recycle gas compressor can be reduced, e.g., from 2.28 kWh per ton of pygas for the trickle bed reactor to 0.96 kWh per ton of pygas for the monolithic reactor, with smaller less expensive gas compressors being used.

As yet another benefit, the reduced hydrogen recycle requirements of the monolithic catalyst system result in increased hydrogen purity at the reactor inlet, e.g., 89.5 mole % for the monolithic reactor versus 85.5 mole % for the trickle bed reactor. This is simply due to the smaller volume of treating gas which is recycled and used, at approximately the same level of hydrogen consumption or amount of make-up gas added, where the make-up gas is added at a hydrogen purity of 90 mole %.

One result of these and other advantages of monolithic catalyst reactors is that the operating costs for the reactor are lower. Table 7 below sets forth data in summary form providing a direct comparison between trickle bed and monolithic catalyst reactors such as described in Examples 3 and 4 above in terms of the utilities costs of reactor operation for equivalent processing capacity. Again, the advantages of the use of monolithic catalyst reactors for the hydrotreatment of pyrolysis gasoline feeds, including a significant reduction in reactor volume due to the reduced volume of catalyst required are evident.

TABLE 7

Operating Utilities - Monolith v. Trickle Bed Reactors

| Utilities | Trickle Bed Operation (Comparative) | Monolith Operation (Invention) | Difference Monolith - TBR |
|---|---|---|---|
| Make-up Hydrogen Consumption | 512 kg/h | 498 kg/h | −14 kg/h |
| Bleed Gas | 35 kg/h | 35 kg/h | 0 |
| Electricity | 256 kW | 170 kW | −86 kW |
| Cooling Water | 175 m$^3$/h | 174 m$^3$/h | −1 m$^3$/h |
| Catalyst Volume per Reactor Load | 44 m$^3$ | 6.6 m$^3$ | −37.6 m$^3$ |

As the above data indicate, the use of multiple monolithic catalyst beds allows for effective multi-stage gas injection along the length of the reactors. This is helpful to better control the two-phase flow regime (gas/liquid), especially where a major component in the gas is consumed by reaction, and to control exothermic temperature rise across catalyst beds. Reactors incorporating 2–4 catalyst beds provide excellent performance for many applications, but even larger numbers of beds can be used if desired. A system and processing alternative employing a large number of monolithic catalyst beds is illustrated in the following example.

EXAMPLE 5

Alternative Monolith Catalyst Reactor Design

A reactor based on the same generic process layout, feed conditions and catalyst as in Example 4 is evaluated, but in this case with a slightly modified catalyst bed arrangement and gas injection scheme. In this reactor six rather than three monolithic catalyst beds of the kind described in Example 1 are specified, and five gas injection points are provided. This arrangement permits control over the gas to oil ratio within the reactor to within a very narrow range. For example, maintaining a gas to liquid volumetric ratio above 0.5:1 at all points in the reactor is readily achieved.

The catalyst volume fraction and operating parameters for each of the monolith catalyst bed sections are reported below in Table 8. The designed operating parameters and projected conversion performance for this reactor design are summarized in Table 9. In this particular reactor design, the recycle liquid reactor temperature control is injected between the forth and the fifth catalyst beds, and is adjusted to 19% of the pygas feed rate to the reactor.

TABLE 8

Six-Bed Reactor Catalyst Design and Operation

| Catalyst Bed | I | II | III | IV | V | VI |
|---|---|---|---|---|---|---|
| % Catalyst Volume | 15.3% | 15.3% | 12.2% | 7.6% | 23% | 26.6% |
| G:L Inlet | 0.72 | 0.72 | 0.70 | 0.74 | 0.82 | 0.97 |
| G:L Outlet | 0.60 | 0.58 | 0.56 | 0.65 | 0.66 | 0.66 |
| Temperature Inlet | 70° C. | 79° C. | 91° C. | 103° C. | 102° C. | 118° C. |
| Temperature Outlet | 80° C. | 92° C. | 104° C. | 113° C. | 119° C. | 140° C. |

TABLE 9

Six-Bed Reactor Operation and Performance

| Process Variable | |
|---|---|
| LHSV | 11.9 h$^{-1}$ |
| Reactor Inlet Temperature | 70° C. |
| Reactor Inlet Pressure | 36.7 bar |
| Gas to Oil Ratio | 0.84 m$^3$/m$^3$ |
| (inlet to reactor, actual conditions) | |
| Hydrogen Content of Treat Gas | 89.8% mole |
| (prior to mixing with pygas) | |

| Product Data | Content | Conversion |
|---|---|---|
| Total Dienes | 0.97 wt % | 90.78% |
| Total Olefins | 8.57 wt % | -17.16% |
| Total Styrene | 0.26 wt % | 86.56% |

EXAMPLE 6

Second Alternative Monolith Catalyst Reactor Design

A reactor based on the same generic process layout, feed conditions and catalyst as in Example 4 is evaluated, but again with a slightly modified catalyst bed arrangement and gas injection scheme. In this reactor only two monolithic catalyst beds of the kind described in Example 1 are specified, and only one gas injection point is provided. Although this arrangement permits less control over the gas to oil ratio within the reactor than possible with the designs described above, control remains adequate and substantial performance advantages over pellet bed reactors are retained.

The catalyst volume fractions and operating parameters for each of the two monolith catalyst bed sections are reported below in Table 10. The designed operating parameters and projected conversion performance for this reactor design are summarized in Table 11. The recycle liquid for reactor temperature control between the two monolith catalyst beds is again adjusted to 19% of the pygas feed rate to the reactor.

TABLE 10

Two-Bed Reactor Catalyst Design and Operation

| Catalyst Bed | I | II |
|---|---|---|
| Relative Catalyst Volume | 47% | 53% |
| G:L Inlet | 0.87 | 0.98 |
| G:L Outlet | 0.34 | 0.61 |
| Temperature Inlet | 70° C. | 100° C. |
| Temperature Outlet | 111° C. | 141° C. |

TABLE 11

Two-Bed Reactor Operation and Performance

| Process Variable | |
|---|---|
| LHSV | 11.8 h$^{-1}$ |
| Reactor Inlet Temperature | 70° C. |
| Reactor Inlet Pressure | 36.7 bar |
| Gas to Oil Ratio | 0.84 m$^3$/m$^3$ |
| (inlet to reactor, actual conditions) | |
| Hydrogen Content of Treat Gas | 89.4% mole |
| (prior to mixing with pygas) | |

TABLE 11-continued

Two-Bed Reactor Operation and Performance

| Product Data | Content | Conversion |
|---|---|---|
| Total Dienes | 1.00 wt % | 90.49% |
| Total Olefins | 8.60 wt % | -17.80% |
| Total Styrene | 0.265 wt % | 86.14% |

Figure 3A:
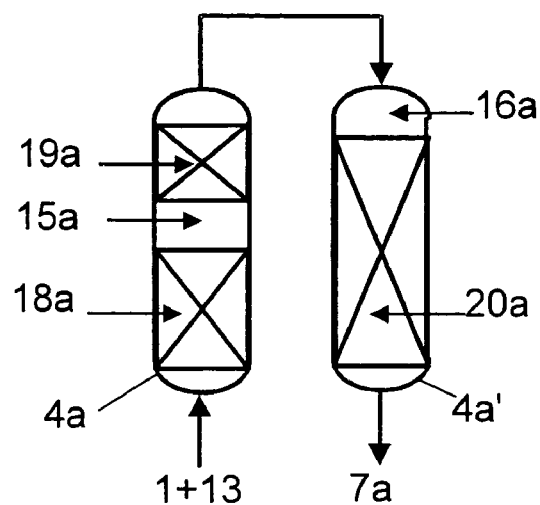
FIGS. 3a and 3b illustrate alternative process and reactor designs for pyrolysis gasoline hydrotreatment, FIG. 3a illustrating a co-current upflow system and FIG. 3b a co-current downflow system.
Figure 3B:
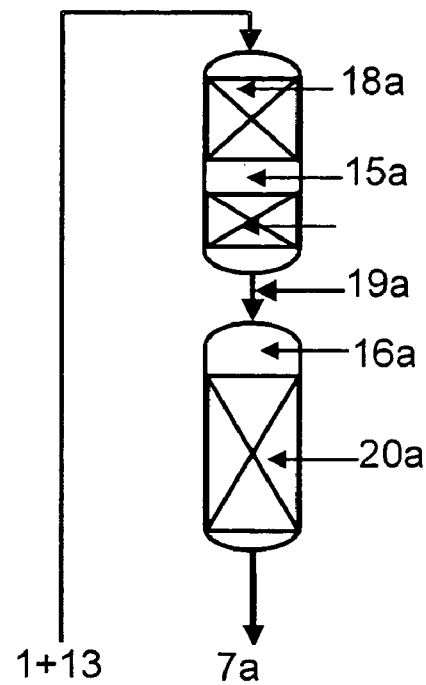

Various other designs for monolithic catalyst reactors for pyrolysis gasoline hydrotreating are possible within the scope of the invention. Examples of two additional designs are shown in FIGS. 3a and 3b of the drawings. Each of these reactors comprises three catalyst beds 18a, 19a, and 20a with interstage injection of hydrogen containing gas at injection points 15a and 16a to maintain sufficient hydrogen in the reactor to maintain high conversion efficiency. However, in these designs the catalyst beds are split into two reactor vessels 4a and 4a', for example, to accommodate an existing reactor system during a conversion to a monolithic catalyst system via a system upgrade.

The system illustrated in FIG. 3a is representative of a system that would be operated in a co-current upflow mode in reactor 4a, i.e., both gas and liquid phases 1 and 13 would flow upwardly through that reactor vessel. The system illustrated in FIG. 3b is a co-current downflow system wherein the catalyst beds are separated. In that embodiment the use of a catalyst pellet bed in place of one or two of the monolith catalyst beds is possible, if retention of such a bed in such a system were desired.

Of course the foregoing materials, components, descriptions and embodiments of the invention are merely illustrative of the variations possible within the scope of the invention as defined by the appended claims.

We claim:

1. A process for hydrotreating pyrolysis gasoline feed, comprising the step of:
    flowing said pyrolysis gasoline feed with a hydrogen-containing treatment gas through a reactor vessel incorporating multiple catalyst beds, the catalyst beds comprising monolithic catalysts having cell densities in the range of 10–2000 cpsi, while
    introducing at least a portion of the hydrogen-containing treatment gas between said catalyst beds in proportions effective to maintain gas to liquid flow ratios in the range of 0.2–2 in each of the catalyst beds, thus to provide reacted pyrolysis gasoline product.

2. The process of claim 1 wherein said monolithic catalyst comprises an Al$_2$O$_3$-containing catalyst support surface of gamma-alumina, theta-alumina, or combinations thereof.

3. The process of claim 2 wherein said Al$_2$O$_3$-containing catalyst support surface is a coating on a cordierite monolith.

4. The process of claim 1, wherein said monolithic catalyst comprises a metal hydrogenation catalyst component selected from the group consisting of nickel, platinum, palladium, rhodium, ruthenium, silver, iron, copper, cobalt, chromium, iridium, tin, and mixtures and alloys thereof.

5. The process of claim 1, wherein said flowing step is carried out at about 20° C. to about 350° C.

6. The process of claim 1, wherein said flowing is carried out at a pressure of about 5 bar to about 100 bar.

7. The process of claim 1, wherein said flowing is carried out at a liquid hourly space velocity greater than 0.1 hr$^{-1}$.

8. The process of claim 1 wherein said flowing is carried out at a volumetric gas to liquid ratio of 0.1 to 10:1.

9. The process of claim 1, wherein said hydrogen-containing treatment gas comprises at least about 50 mol % of molecular hydrogen.

10. The process of claim 1 wherein said feed flows through two to four catalyst beds.

11. The process of claim 1 wherein said flowing provides a conversion of dienes in said pyrolysis gasoline feed of greater than 10%.

12. The process of claim 1, wherein a liquid portion of said reacted pyrolysis gasoline is recycled.

13. The process of claim 1 wherein the monolithic catalyst comprises a nickel metal hydrogenation catalyst.

* * * * *